United States Patent [19]
Hwang et al.

[11] Patent Number: 5,908,980
[45] Date of Patent: Jun. 1, 1999

[54] INTEGRATED SAFETY CONTROL SYSTEM FOR USER'S GAS FACILITY AND GAS LEAKAGE RECOGNIZING METHOD

[75] Inventors: Jung Hoon Hwang; Ho Young Song; Woon Sik Cho; Sang Woo Lee, all of Tae Gu, Rep. of Korea

[73] Assignee: Tae Gu City Gas Co. Ltd, Rep. of Korea

[21] Appl. No.: 08/981,796

[22] PCT Filed: Jan. 24, 1996

[86] PCT No.: PCT/KR96/00010

§ 371 Date: Dec. 24, 1997

§ 102(e) Date: Dec. 24, 1997

[87] PCT Pub. No.: WO97/01748

PCT Pub. Date: Jan. 16, 1997

[30] Foreign Application Priority Data

Jun. 24, 1995 [KR] Rep. of Korea ...................... 95/17268

[51] Int. Cl.⁶ ............................................... G01M 3/28
[52] U.S. Cl. .......................... 73/40; 137/78.4; 137/557; 340/605; 379/106.01
[58] Field of Search ................... 73/40; 340/605, 340/626, 870.01, 870.02, 870.03; 379/106.01, 106.03; 137/78.4, 557

[56] References Cited

U.S. PATENT DOCUMENTS

| | | | |
|---|---|---|---|
| 4,787,410 | 11/1988 | Fujieda et al. | 137/78.4 |
| 5,151,932 | 9/1992 | Arizumi et al. | 379/106 |
| 5,539,384 | 7/1996 | Frasier | 340/605 |
| 5,586,050 | 12/1996 | Makel et al. | 73/40 X |
| 5,655,561 | 8/1997 | Wendel et al. | 340/605 |

FOREIGN PATENT DOCUMENTS

| | | | |
|---|---|---|---|
| 197 147 A1 | 10/1984 | European Pat. Off. | 137/78.4 |
| 523655 | 1/1993 | European Pat. Off. | |
| 6-276283 | 9/1994 | Japan | |
| WO 86/02431 | 4/1986 | WIPO | 137/78.4 |

Primary Examiner—Hezron Williams
Assistant Examiner—Daniel S. Larkin
Attorney, Agent, or Firm—Quarles & Brady

[57] ABSTRACT

An integrated safety control system comprises a controller unit, driver unit, first transmitter/receiver unit, and a second transmitter/receiver unit. The controller unit outputs control signals respectively based on input signals received thereto to control the entire system. The driver unit drives the entire system in accordance in accordance with the control signals from the controller unit. The first transmitter/receiver unit is equipped in the driver unit and is serving to receive the control signals from the controller unit and to transmit data from the driver unit to the controller unit. The second transmitter/receiver is equipped in the controller unit and is serving to transmit the controls signals from the controller unit to the driver unit and to receive data transmitted from the driver unit.

4 Claims, 3 Drawing Sheets

INTEGRATED SAFETY CONTROL SYSTEM FOR USER'S GAS FACILITY AND GAS LEAKAGE RECOGNIZING METHOD

TECHNICAL FIELD

The present invention relates to a safety control system for user's gas facilities, and more particularly to an integrated safety control system and a gas leakage recognizing method enabling the user to easily check the gas leakage for the entire user's gas conduit including a gas meter and to manipulate the gas valve by remote control through the telephone so that the gas valve can be automatically cut off.

BACKGROUND ART

Although a variety of safety control systems have been known, they have no function to automatically check the entire user's gas conduit including the gas meter. They can check only a particular gas conduit portion. In accordance with conventional gas leakage checking methods, the gas leakage can be checked only when the internal pressure of the gas conduit is decreased to a certain pressure. For this reason, where gas is leaked in a low rate, one hour or more is taken to sense this gas leakage.

Taking into consideration the fact that the gas supplied to the home has a pressure ranging from 100 to 250 mmH$_2$O, the reference pressure for checking the gas leakage is typically determined to range from 50 to 80 mmH$_2$O. Since the actual average gas supply pressure is about 200 mmH$_2$O, a lot of time is taken for the pressure of the entire gas conduit to decrease from 200 mmH$_2$O to 50 mmH$_2$O.

In accordance with the conventional methods, gas leakage can be checked only after the user closes the gas valve because this checking is based on the internal pressure of the gas conduit. As a result, there is a problem that the user cannot use the gas while checking for leakage. This makes it impossible to check the gas leakage for a long period of time.

For systems having a function to check the hose connected between the gas conduit and the gas range, it is possible to achieve the checking in a short period of time. However, these systems cannot achieve the gas leakage checking for the entire gas conduit because the checking is limited to a particular gas conduit portion such as the hose or the gas range. For this reason, these systems are insufficiently safe.

DISCLOSURE OF INVENTION

Therefore, the present invention has been made in view of the above-mentioned problems and an object of the invention is to provide an integrated safety control system for user's gas facilities and a gas leakage recognizing method using the integrated safety control system, enabling the user to easily check the gas leakage for the entire user's gas conduit and to manipulate the gas valve by remote control through the telephone so that the gas valve can be cut off, and capable of automatically cutting off the gas valve when an abnormal pressure is generated in the gas conduit and of always displaying the gas supply pressure.

In accordance with one aspect, the present invention provides an integrated safety control system for a user's gas facility, comprising: a controller unit for outputting control signals respectively based on input signals received thereto, thereby controlling the entire system; a driver unit for driving the entire system in accordance with the control signals from the controller unit; a first transmitter/receiver unit equipped in the driver unit, the first transmitter/receiver unit serving to receive the control signals from the controller unit and to transmit data from the driver unit to the controller unit; and a second transmitter/receiver unit equipped in the controller unit, the second transmitter/receiver unit serving to transmit the control signals from the controller unit to the driver unit and to receive the data transmitted from the driver unit.

In accordance with another aspect, the present invention provides a method for recognizing a gas leakage occurring in a user's gas facility using an integrated safety control system including a driver unit for opening and closing a gas valve equipped in the gas facility, and a controller unit for controlling the driver unit, the controller unit having a gas leakage check switch, comprising the steps of: (a) pressing down the gas leakage check switch, thereby initiating a checking about whether a gas leakage occurs in the gas facility; (b) setting a gas pressure in the gas facility at a point of time the gas leakage check switch is pressed to a reference pressure; (c) comparing a currently measured gas pressure in the gas facility with the reference pressure set at the step (b) to determine whether the current gas pressure is lower than the reference pressure by at least a predetermined value, and determining that a gas leakage has occurred when the current gas pressure is lower than the reference pressure by at least the predetermined value, thereby controlling the controller unit to generate a control signal for closing the gas valve; (d) controlling the driver unit in accordance with the control signal generated at the step (c), thereby closing the gas valve; and (e) displaying a situation indicative of both the generated gas leakage and the closing of the gas valve when the gas valve is closed.

BRIEF DESCRIPTION OF THE DRAWINGS

Other objects and aspects of the invention will become apparent from the following description of embodiments with reference to the accompanying drawings in which.

BEST MODE FOR CARRYING OUT THE INVENTION

Figure 1:
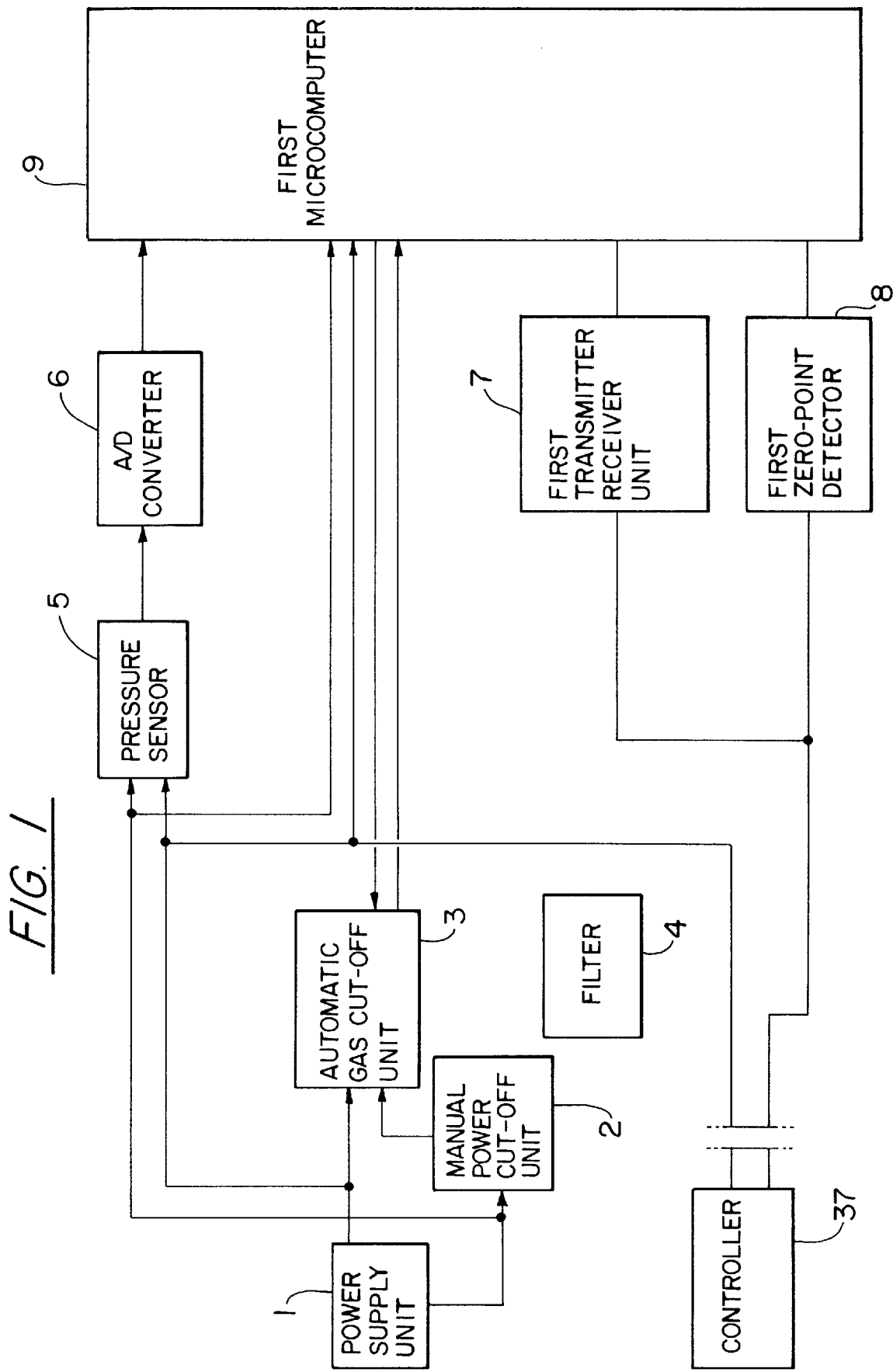
FIG. 1 is a block diagram illustrating a driver unit of an integrated safety control system for a user's gas facility according to the present invention.
Figure 2:
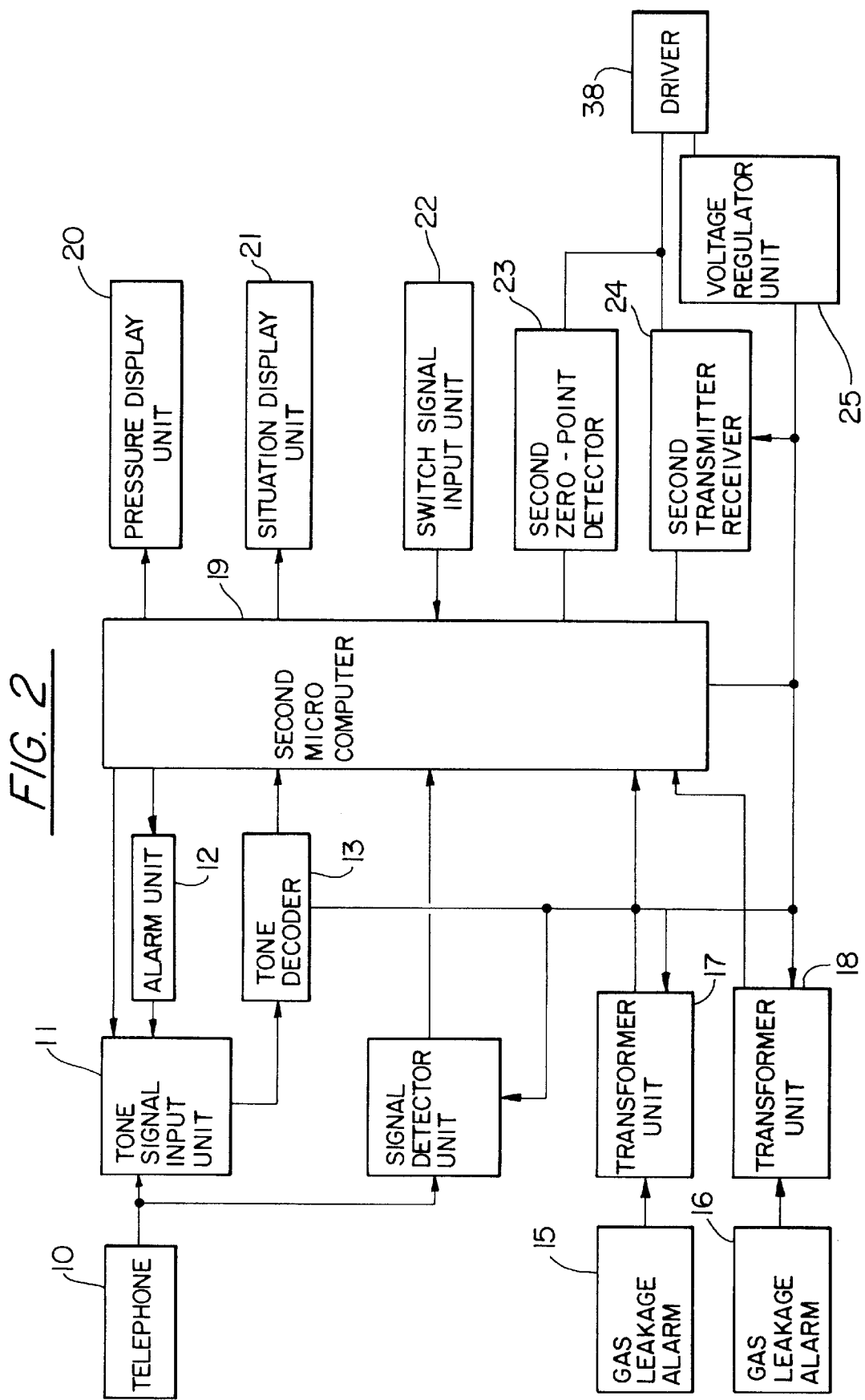
FIG. 2 is a block diagram illustrating a controller unit of the integrated safety control system shown in FIG. 1.

FIGS. 1 and 2 illustrate an integrated safety control system for a user's gas facility according to the present invention. This system is coupled to a gas conduit of the user's gas facility above a gas meter connected to the gas conduit. The system includes a driver unit 38 for driving various units of the system and a controller unit 37 for controlling the driver unit 38. The arrangement of the driver unit is illustrated in FIG. 1 whereas the arrangement of the controller unit is illustrated in FIG. 2.

In FIG. 1, the reference numeral 1 denotes a power supply unit for receiving electric power from an external power supply source and supplying the received electric power to various parts of the system. The reference numeral 2 denotes a manual power cut-off unit for manually cutting off the electric power supplied from the power supply unit 1 to an automatic gas cut-off valve unit 3 which will be described hereinafter. The manual power cut-off unit 2 is provided to prevent the integrated safety control system from being manipulated by unauthorized people. The automatic gas cut-off valve unit 3 is controlled by a control instruction output from a first microcomputer 9, which will be described hereinafter, to open and close a gas valve installed in the gas conduit. The automatic gas cut-off valve unit 3 also senses the open/close state of the gas valve and sends a signal indicative of the sensed result to the first microcomputer 9. A filter 4 is integral with the automatic gas cut-off valve unit 3 to filter gas passing through the gas conduit, thereby removing dust contained in the gas. The driver unit 38 also includes a pressure sensor 5 for sensing the internal pressure of the gas conduit in the form of a minute voltage and amplifying the resultant voltage, and an analog/digital (A/D) converter 6 for converting an output signal from the pressure sensor 5 into a digital signal which will be sent to the first microcomputer 9. In FIG. 1, the reference numerals 7 and 8 are a first transmitter/receiver unit and a first zero point detector unit, respectively. The first transmitter/receiver unit 7 exchanges various data with a controller unit 37 which will be described hereinafter. The first zero point detector unit 8 serves to set a reference point for the data transmission/receiving via AC lines. The first microcomputer 9 is coupled to the A/D converter 6, automatic gas cut-off valve unit 3, first transmitter/receiver unit, and first zero point detector unit 8 so that it can function as control means for controlling the overall units of the driver unit 38.

FIG. 2 is a block diagram illustrating the controller unit according to the present invention. This controller unit is installed in the kitchen or living room such that it can be easily manipulated by the user.

In FIG. 2, the reference numeral 10 denotes a telephone which is used as means for enabling the user to manipulate the gas valve by remote control at a place outside the house installed with the system of the present invention. The reference numeral 11 denotes a tone signal input unit for receiving an externally generated tone signal via the telephone 10 under the control of a second microcomputer 19. Between the tone signal input unit 11 and the second microcomputer 19, an alarm unit 12 is connected to inform the user of a fact that the gas valve has been cut off. A tone decoder 13 is also coupled between the tone signal input unit 11 and the second microcomputer 19. The tone decoder 13 decodes the tone signal from the tone signal input unit 11 and sends the decoded signal to the second microcomputer 19. A signal detector unit 14 is coupled between the telephone 10 and the second microcomputer 19. The signal detector unit 14 detects an output signal from the telephone 10 and applies the received signal to the second microcomputer 19.

The reference numerals 15 and 16 denote gas leakage alarm units connected to alarm connecting terminals of the controller unit 37, respectively. The gas leakage alarm units 15 and 16 are installed outside the controller unit 37. The reference numerals 17 and 18 are transformer units for converting respective output voltages from the gas leakage alarm units 15 and 16 into those used in the controller unit 37. For example, each of the transformer units 17 and 18 convert a 9V voltage output from each corresponding gas leakage alarm unit 15 and 16 so that it can be matched with a 5V voltage used in the controller unit 37. The second microcomputer 19 serves to generate various control signals for controlling various units of the controller unit 37.

To the microcomputer 19, a pressure display unit 20 is coupled which displays the pressure of the gas being used on a pressure display panel 36 under the control of the second microcomputer 19. A situation display unit 21 is also coupled to the microcomputer 19. The situation display unit 21 has a plurality of lamps which turn on or off under the control of the second microcomputer 19 to display gas leakage, abnormal pressure, circuit trouble, checking conditions, the state of each gas leakage alarm unit, and the open/close state of the gas valve. The reference numeral 22 denotes a switch signal input unit which receives various switch signals respectively associated with the valve opening, valve closing, checking and alarm recovery and sends the received signals to the second microcomputer 19. Reference numerals 23 and 24 denote a second zero point detector unit and a second transmitter/receiver unit, respectively. The second zero point detector unit 23 serves to set a reference point for the data transmission/receiving via AC lines. The second transmitter/receiver unit 24 exchanges various data with the driver unit. The reference numeral 25 denotes a voltage regulator unit for receiving electric power through driver unit 38 or receiving from another external power supply source (not shown) and supplying constant voltage to various units of the controller unit 37.

The controller unit 37 may be equipped in a conventional room temperature controller.

Figure 3:
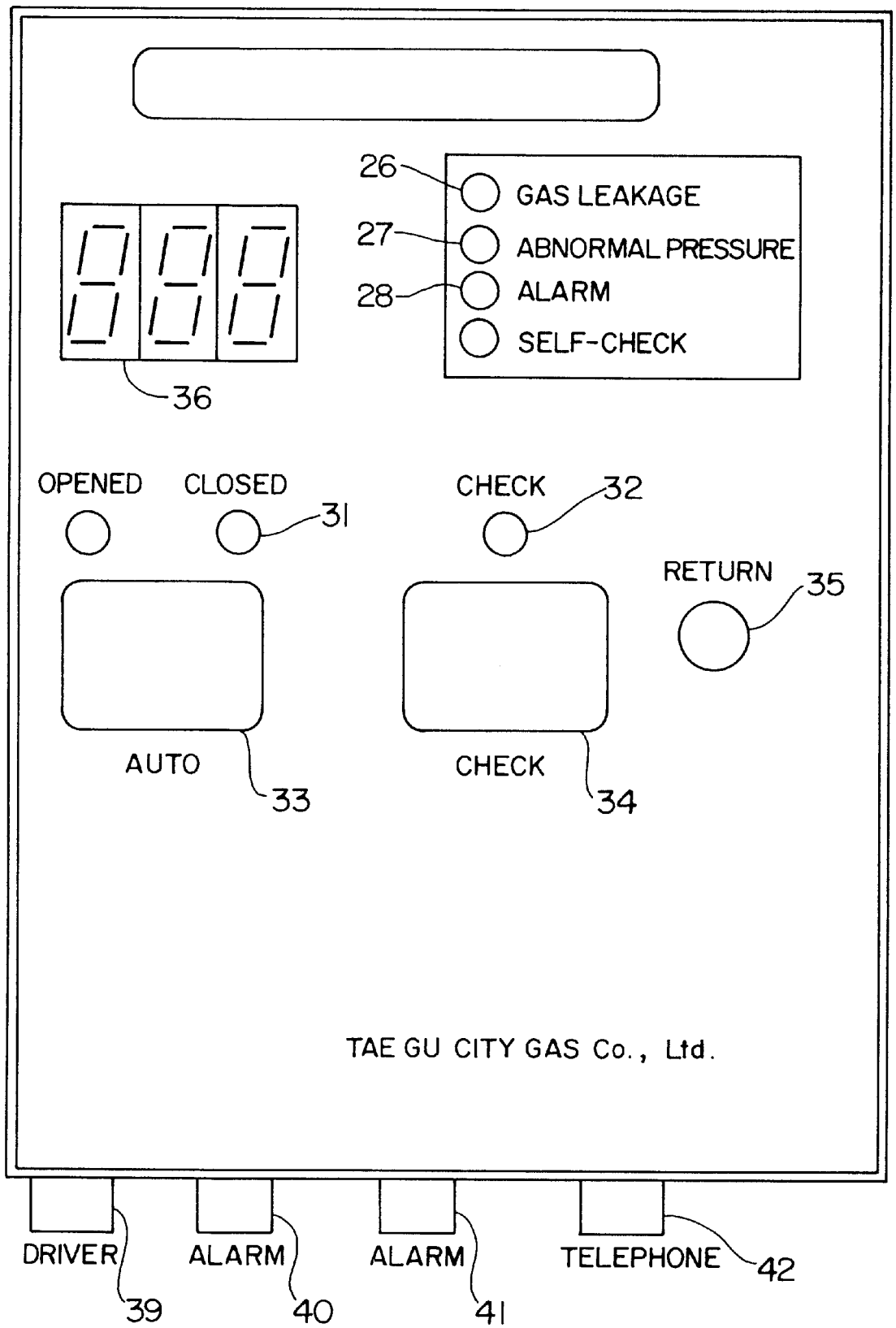
FIG. 3 is a front view illustrating the appearance of the controller unit shown in FIG. 2.

FIG. 3 illustrates the appearance of the controller unit according to the present invention.

As shown in FIG. 3, the pressure display panel 36 always displays the internal pressure of the gas conduit in accordance with a pressure displaying operation of the pressure display units 20.

Once the pressure sensor 5, which is mounted in the driver unit 38 in opposition to the gas valve, senses the internal pressure of the gas conduit in the form of a minute voltage, it amplifies the resultant voltage indicative of the sensed pressure and then sends it to the first microcomputer 9. This signal is then sent from the first microcomputer 9 to the second microcomputer 19 of the controller unit 37 via the first and second transmitter/receiver units 7 and 24. The second microcomputer 19 sends the received signal to the pressure display unit 20, thereby causing the pressure display panel 36 of the pressure display unit 20 to display the sensed pressure.

Most foreign matters, including dust and moisture, contained in the gas passing through the gas conduit are removed from the gas by the filter 4 which is integral with the automatic gas cut-off valve 3. Since the pressure sensor 5, which is disposed downstream the automatic gas cut-off valve 3, senses the dust/moisture-free gas emerging from the filter 4, its life can be lengthened. In particular, it is possible to prevent the pressure sensor 5 from being erroneously operated due to foreign matter.

In accordance with the present invention, it is also possible to automatically check the gas leakage. This will be described in detail.

When the user desires to check the gas leakage, he presses down a check switch 34 (FIG. 3) equipped in the controller unit 37. When the check switch 34 is pressed down, it generates a switch signal for enabling the checking for gas leakage. The switch signal from the check switch 34 is sent to the switch signal input unit 22 equipped in the controller unit 37 and then to the second microcomputer 19. In response to the switch signal, the second microcomputer 19 controls the situation display unit 21 so that a check lamp 32 equipped in the situation display unit 21 will be turned on. The second microcomputer 19 also sends a control signal to the first microcomputer 9 of the driver unit 38 from the second transmitter/receiver unit 24, via a driver port 39, and then to the first transmitter/receiver unit 7.

In accordance with the received control signal, the first microcomputer 9 controls the automatic gas cut-off valve unit 3 to close the gas valve. The automatic gas cut-off valve unit 3 senses the closed state of the gas valve and sends a valve closed signal to the first microcomputer 9. The valve closed signal is then sent from the first Microcomputer 9 to the second microcomputer 19 via the first and second transmitter/receiver units 7 and 24. In response to the valve closed signal, the second microcomputer 19 controls the situation display unit 21 so that a valve closed lamp 31 equipped in the situation display unit 21 will be turned on.

Meanwhile, the internal pressure of the gas conduit at a point of time the user presses down the check switch 34 is set to a reference pressure. When the internal pressure of the gas conduit has been dropped from the reference pressure by a small pressure, for example, 3 mmH$_2$O in the case of the gas supplied to the home, it is determined that gas leakage has occurred. In this case, the second microcomputer 19 generates a desired control signal which is, in turn, sent to the situation display unit 21 so that a gas leakage lamp 26 will be turned on. By this control signal, a gas leakage alarm is also raised.

Since the determination about the gas leakage is made by determining whether the internal pressure of the gas conduit has been dropped by a small pressure from the reference pressure, that is, the pressure set at the point of time the check switch 34 is pressed down, this checking can be completed within a short period of time, for example, 5 minutes. The gas pressure at the point of time the check switch 34 is pressed down is numerically displayed on the pressure display plate 36. Accordingly, it is possible to not only identify the current gas pressure, but also to check a subsequent variation in gas pressure, thereby sensing the leaked amount of gas. Therefore, it is possible to rapidly cope with the gas leak.

The above gas leakage checking operation may also be applied to other consumer's gas facilities, such as commercial or industrial gas facilities, using gas under less than 1 K/cm$_2$ of pressure, by appropriately varying the pressure drop value.

In accordance with the present invention, the gas valve can be cut off by remote control through the telephone. This remote control operation will now be described in detail.

For this remote control operation, the telephone 10 is connected to the controller unit by connecting a telephone line emerging from the telephone 10 to a telephone line connecting terminal 42 provided at the lower end of the controller unit as shown in FIG. 3. When the user makes a phone call at a place outside the house installed with the system of the present invention, the telephone 10 generates a signaling tone which is, in turn, applied to the signal detector unit 14. If the signaling tone corresponds to a predetermined signaling tone, it is then sent to the second microcomputer 19. In response to the received signaling tone, the second microcomputer 19 applies a control signal to the tone signal input unit 11. Based on the received control signal, the tone signal input unit 11 is enabled to receive a tone signal which will be generated from the external via the telephone 10.

Once the user inputs, through an external telephone, a particular dial number predetermined to close the gas valve, under the control of a second microcomputer 19, a tone signal corresponding to the predetermined dial number is generated from the telephone 10 and then received by the tone signal input unit 11. The tone signal from the tone signal input unit 11 is then applied to the tone decoder 13 which, in turn, decodes the tone signal and sends the resultant signal to the second microcomputer 19. Based on the output signal from the tone decoder 13, the second microcomputer 19 applies a control signal to the first microcomputer 9 of the driver unit via the second and first transmitter/receiver unit 24 and 7. By this control signal, the automatic gas cut-off valve unit 3 operates to close the gas valve.

Once the gas valve is closed, a valve closed signal is sensed by the automatic gas cut-off valve unit 3 which, in turn, sends the sensed signal to the first microcomputer 9. This signal is then sent to the second microcomputer 19 via the first and second transmitter/receiver units 7 and 24. In response to the received signal, the second microcomputer 19 applies a control signal to the situation display unit 21, thereby causing the valve closed lamp 31 to be turned on. In accordance with this control signal, the alarm unit 12 also informs the user of the completion of the valve closing operation.

In accordance with the present invention, the gas valve is automatically closed when gas leakage is sensed by gas leakage alarm units which may be conventional ones installed for the purpose of detecting the gas leakage and sounding an alarm upon detecting the gas leakage. This will now be described in detail.

For this operation, the controller unit has at its lower end a pair of alarm connecting terminals 40, 41 (FIG. 3) for connecting the gas leakage alarm units to the controller unit. Once these gas leakage alarm units are connected to the controller unit, they function as the gas leakage alarm units 15 and 16 according to the present invention. When the gas leakage alarm units 15 and 16 detect gas leakage, they generate detect signals which are, in turn, applied to the second microcomputer 19 via the transformers 17 and 18, respectively. In response to those signals, the second microcomputer 19 applies a control signal to the first microcomputer 9 of the driver unit via the second and first transmitter/receiver units 24 and 7.

Based on the control signal, the first microcomputer 9 controls the automatic gas cut-off valve unit 3 so that the gas valve will be closed. Once the gas valve is closed, a valve closed signal is sensed by the automatic gas cut-off valve unit 3 which, in turn, sends the sensed signal to the first microcomputer 9. This signal is then sent to the second microcomputer 19 via the first and second transmitter/receiver units 7 and 24. In response to the received signal, the second microcomputer 19 applies a control signal to the situation display unit 21, thereby causing the valve closed lamp 31 to be turned on. In accordance with this control signal, an alarm operation lamp 28 equipped in the situation display unit 21 is also turned on. In this case, the alarm is also sounded to inform the user of the fact that the gas leakage alarm units are in operation.

In place of such gas leakage alarm units, fire alarm units may be connected to the alarm connecting terminals of the controller unit 37. In this case, the gas valve is automatically closed when the controller unit 37 senses fire alarm signals generated from the fire alarm units. This operation is carried out in the same manner as that in the case using the gas leakage alarm units.

In accordance with the present invention, the gas valve is also automatically closed when an abnormal pressure generated in the gas conduit is sensed.

For this operation, the pressure sensor 5 equipped in the driver unit always senses the internal pressure of the gas conduit and sends it to the first microcomputer 9 which, in turn, applies it to the second microcomputer 19 via the first and second transmitter/receiver units 7 and 23. The second microcomputer 19 determines whether the sensed pressure is higher than a predetermined pressure, for example, 400 mmH$_2$O in the case of the gas supplied to the home. Where the sensed pressure is higher than the predetermined pressure, the second microcomputer 19 controls the situation display unit 21 so that an abnormal pressure lamp 27 equipped in the situation display unit 21 will be turned on. The second microcomputer 19 also applies a control signal to the first microcomputer 9 via the second and first transmitter/receiver units 24 and 7. In accordance with this control signal, the first microcomputer 9 drives the automatic gas cut-off valve unit 3, thereby causing the gas valve to close.

A valve closed signal is then sensed by the automatic gas cut-off valve unit 3 which, in turn, sends the sensed signal to the first microcomputer 9. This signal is then sent to the second microcomputer 19 via the first and second transmitter/receiver units 7 and 24. The second microcomputer 19 then applies a control signal to the situation display unit 21, thereby causing the valve closed lamp 31 to be turned on. In accordance with this control signal, the alarm unit 12 also informs the user of the generation of abnormal pressure.

In accordance with the present invention, the gas valve can be automatically controlled even during the user's long absence. This can be carried out by pressing down an automatic valve control switch 33 (FIG. 3) equipped in the controller unit 37. When the automatic valve control switch 33 is pressed down, it applies a corresponding switch signal to the second microcomputer 19 via the switch signal input unit 22. The second microcomputer 19 then applies a control signal to the first microcomputer 9 via the second and first transmitter/receiver units 24 and 7. Based on the control signal, the first microcomputer 9 controls the automatic gas cut-off valve unit 3 such that the gas valve is automatically opened and closed in accordance with the situation of the gas facility.

On the other hand, all alarming operations carried out by various alarm units can be released by pressing down a return switch 35 (FIG. 3) equipped in the controller unit. When the return switch 35 is pressed down, the second microcomputer 19 carries out a control to release the generated alarm.

Since the automatic gas cut-off valve unit 3 is provided with the filter being integral therewith, it is possible to prevent the foreign matter contained in the gas from entering the gas meter and combustion unit. Although not shown, the automatic gas cut-off valve unit 3 is also provided with an automatic/manual manipulation switching unit for enabling the automatic valve cut-off valve unit 3 to be manually manipulated. The manual power cut-off unit 2 for manually cutting off the electric power supplied from the power supply unit 1 to an automatic gas cut-off valve unit 3 which will be described hereinafter. By virtue of the manual power cut-off unit 2, it is also possible to prevent the integrated safety control system from being manipulated by unauthorized people. Accordingly, an improvement in safety is obtained.

Industrial Applicability

As apparent from the above description, the present invention provides an integrated safety control system for user's gas facilities and a gas leakage recognizing method using the integrated safety control system, enabling the user to easily check the gas leakage for the entire user's gas conduit in an automatic manner within a short period of time, thereby not only preventing a gas accident, but also eliminating consumer fear caused by the use of gas. In accordance with the present invention, the gas valve is automatically closed when the gas leakage alarm unit is operated. Accordingly, a further gas leakage is surely prevented. In accordance with the present invention, the gas valve is also automatically closed when the gas pressure is higher than the rated gas pressure, thereby not only preventing a fire caused by large flame, but also preventing the breakdown of the gas meter and combustion unit due to high gas pressure.

Although the user is not home when the gas valve is not closed, he can close the gas valve by remote control through the telephone. Accordingly, it is possible to rapidly prevent a fire from occurring.

Therefore, the integrated safety control system for user's gas facilities according to the present invention and the gas leakage recognizing method using the integrated safety control system achieve a safe gas use and prevent any gas accidents caused by the gas leakage.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An integrated safety control system for a user's gas facility, comprising:

a controller unit for outputting control signals respectively based on input signals received thereto, thereby controlling the entire system;

a driver unit for driving the entire system in accordance with the control signals from the controller unit;

a first transmitter/receiver unit equipped in the driver unit, the first transmitter/receiver unit serving to receive the control signals from the controller unit and to transmit data from the driver unit to the controller unit; and a second transmitter/receiver unit equipped in the controller unit, the second transmitter/receiver unit serving to transmit the control signals from the controller unit to the driver unit and to receive the data transmitted from the driver unit.

2. The integrated safety control system in accordance with claim 1, wherein the controller unit comprises:

a microcomputer for controlling the entire controller unit;

a signal detector unit for sensing a signal output from a telephone connected to the controller unit via a telephone connecting terminal provided at the controller unit, the signal detector unit sending the sensed result to the microcomputer;

a tone decoder for sensing a tone signal corresponding to a particular dial number predetermined to close a gas valve equipped in the gas facility under a control of the microcomputer, the tone decoder sending the sensed result to the microcomputer;

a transformer for converting a voltage output from an alarm unit connected to the controller unit via an alarm connecting terminal provided at the controller unit, the transformer sending the converted voltage to the microcomputer;

a pressure display unit for always displaying the internal pressure of a gas conduit equipped in the gas facility on the basis of a control signal output from the microcomputer in accordance with the data transmitted from the driver unit; and a situation display unit for displaying a gas supply situation of the gas facility under a control of the microcomputer.

3. The integrated safety control system in accordance with claim 1, wherein the driver unit comprises:

a microcomputer for controlling the entire driver unit;

a pressure sensor for sensing the internal pressure of a gas conduit equipped in the gas facility in the form of a minute voltage and amplifying the voltage, thereby outputting a voltage-amplified signal;

an analog/digital converter for converting the voltage-amplified signal from the pressure sensor into a digital signal and sending the digital signal to the microcomputer;

an automatic gas cut-off valve unit being driven to open and close a gas valve equipped in the gas facility under a control of the microcomputer; and a manual power cut-off unit for manually cutting off electric power supplied to the automatic gas cut-off valve unit.

4. A method for recognizing a gas leakage occurring in a user's gas facility using an integrated safety control system including a driver unit for opening and closing a gas valve equipped in the gas facility, and a controller unit for controlling the driver unit, the controller unit having a gas leakage check switch, comprising the steps of:

(a) pressing down the gas leakage check switch, thereby initiating a check about whether gas leakage has occurred in the gas facility;

(b) setting a gas pressure in the gas facility at a point of time the gas leakage check switch is pressed to a reference pressure;

(c) comparing a currently measured gas pressure in the gas facility with the reference pressure set at step (b) to determine whether the current gas pressure is lower than the reference pressure by at least a predetermined value, and determining that gas leakage has occurred when the current gas pressure is lower than the reference pressure by at least the predetermined value, thereby controlling the controller unit to generate a control signal for closing the gas valve;

(d) controlling the driver unit in accordance with the control signal generated at step (c), thereby closing the gas valve; and (e) displaying a situation indicative of both the generated gas leakage and the closing of the gas valve when the gas valve is closed.

* * * * *